Aug. 17, 1937.　　　　E. D. DAVIS　　　　2,090,440
DISPLAY SUPPORT
Filed Feb. 19, 1936　　　6 Sheets-Sheet 1
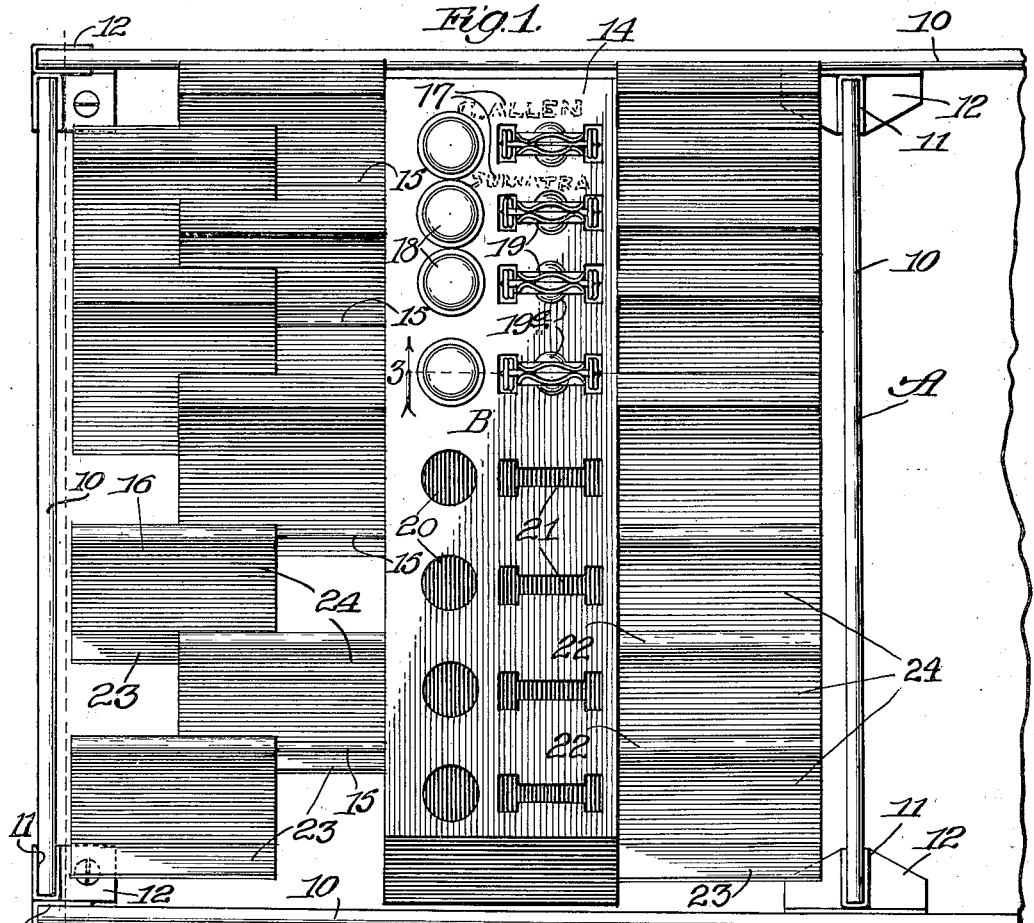
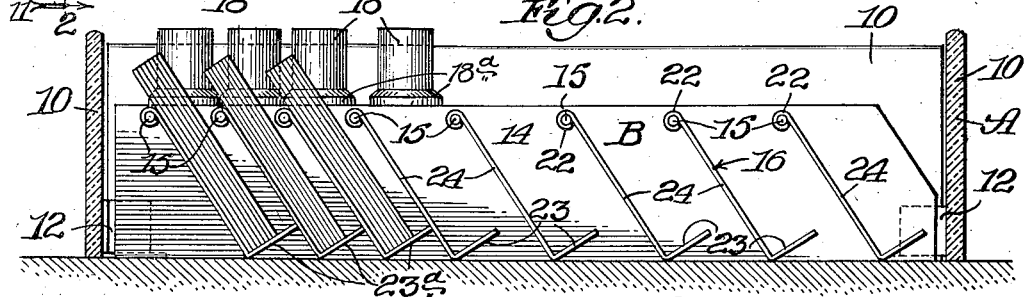
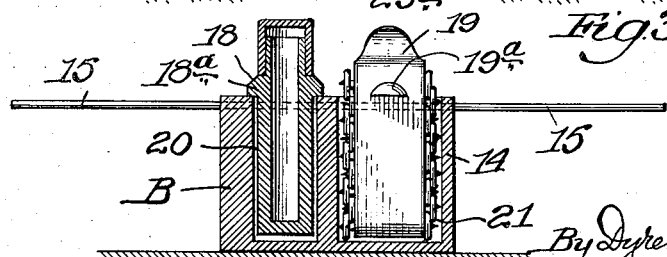
Inventor:
Edward D. Davis,
By Dyrenforth, Lee, Chritton & Niles,
Attys.

Aug. 17, 1937.  E. D. DAVIS  2,090,440
DISPLAY SUPPORT
Filed Feb. 19, 1936  6 Sheets-Sheet 2
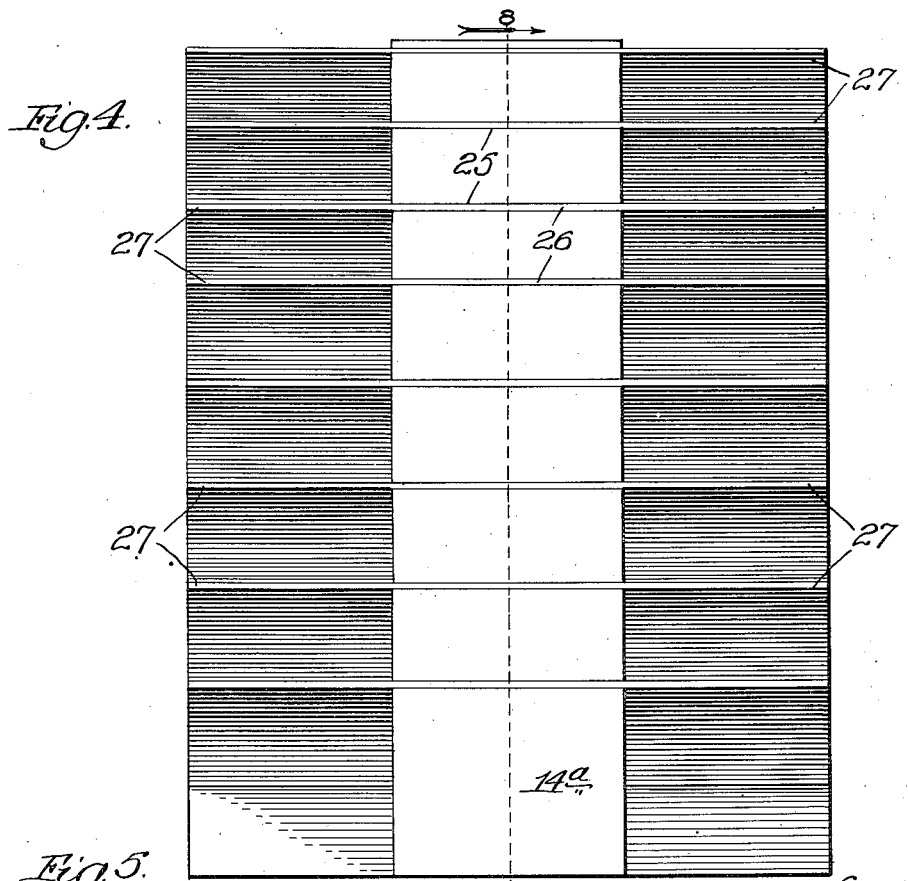
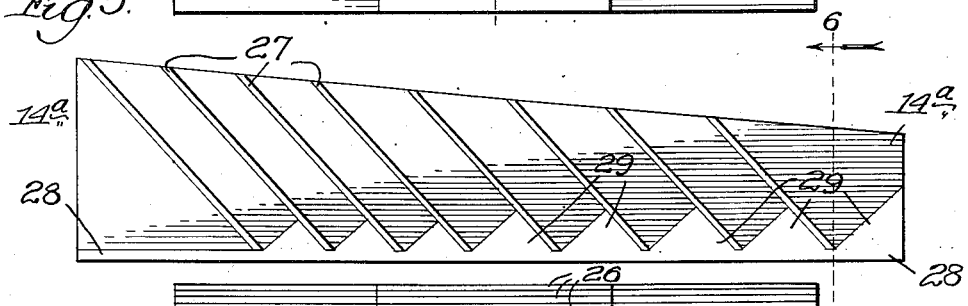
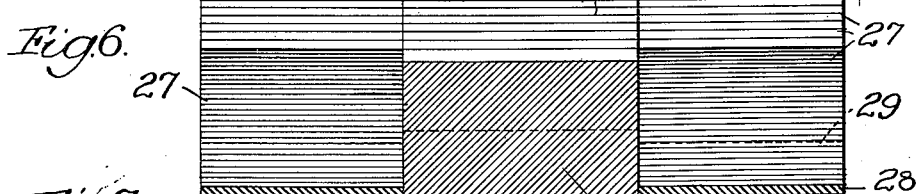
Inventor:
Edward D. Davis,
By Dyrenforth, Lee, Chritton & Wiles,
Attys.

Aug. 17, 1937.  E. D. DAVIS  2,090,440
DISPLAY SUPPORT
Filed Feb. 19, 1936  6 Sheets-Sheet 3
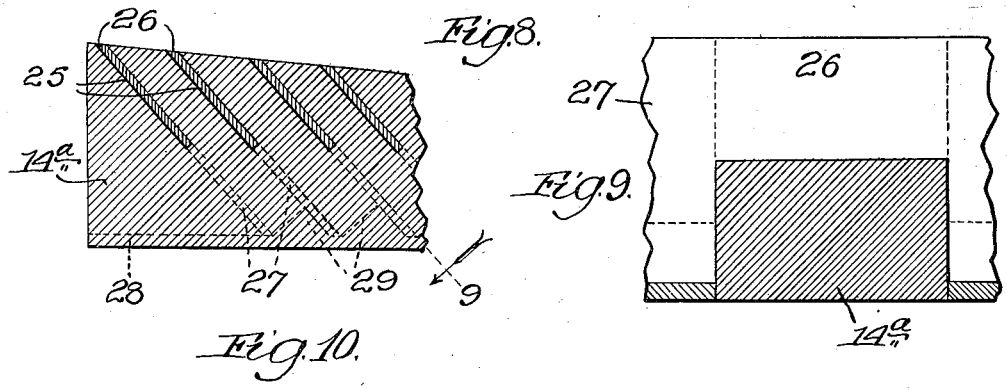
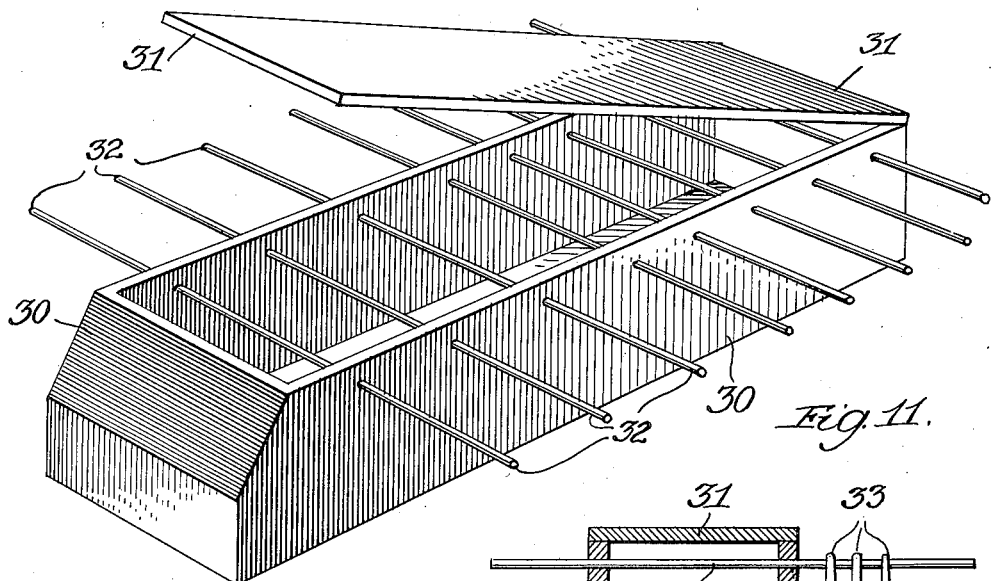
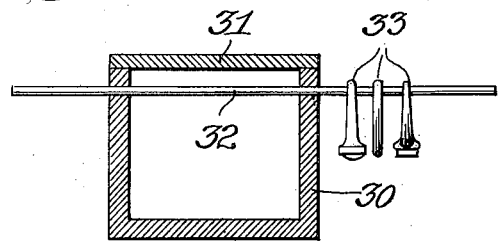
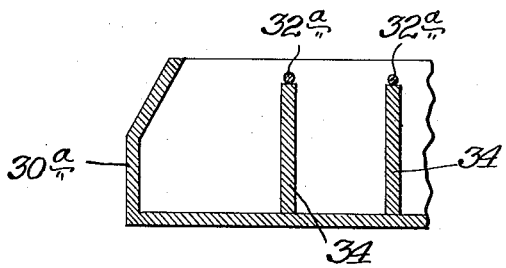
Inventor:
Edward D. Davis,
By Dyrenforth, Lee, Chritton & Wiles,
Attys.

Aug. 17, 1937.  E. D. DAVIS  2,090,440
DISPLAY SUPPORT
Filed Feb. 19, 1936   6 Sheets-Sheet 4
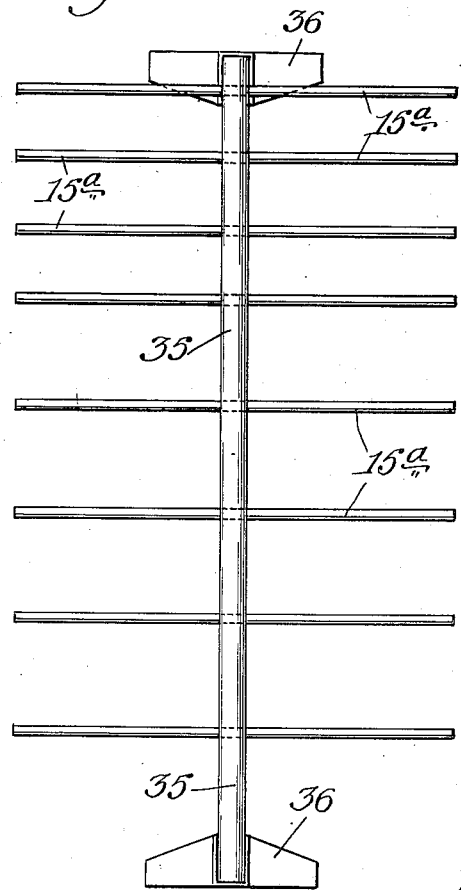
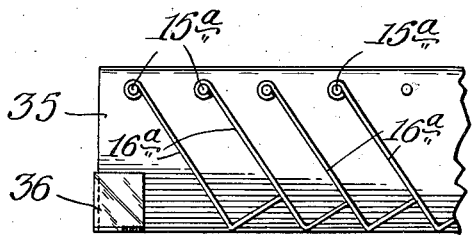
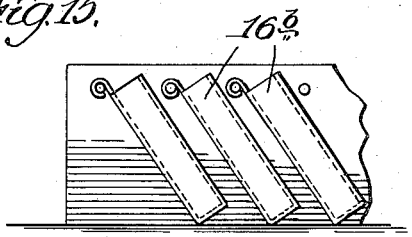
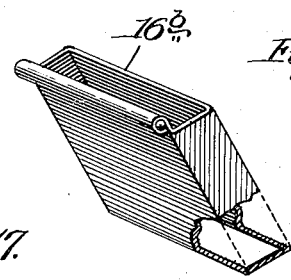
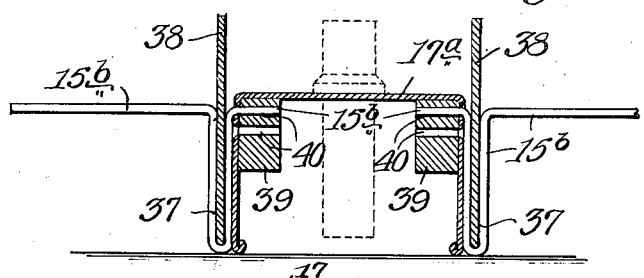
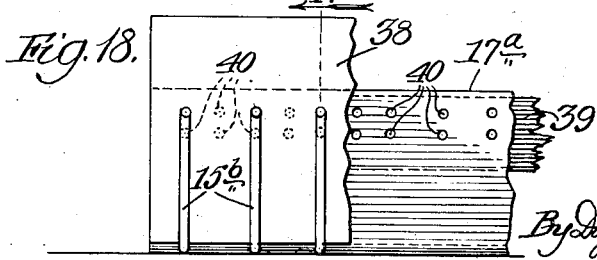
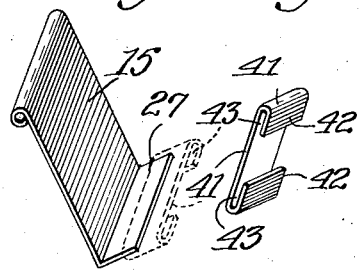
Inventor:
Edward D. Davis,
By Dyrenforth, Lee, Chritton & Wiles,
Attys.

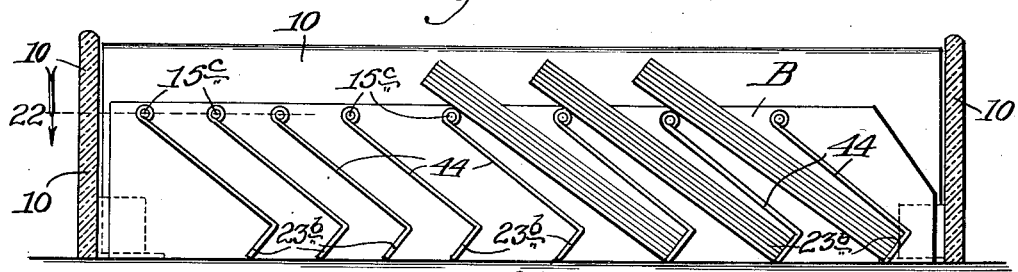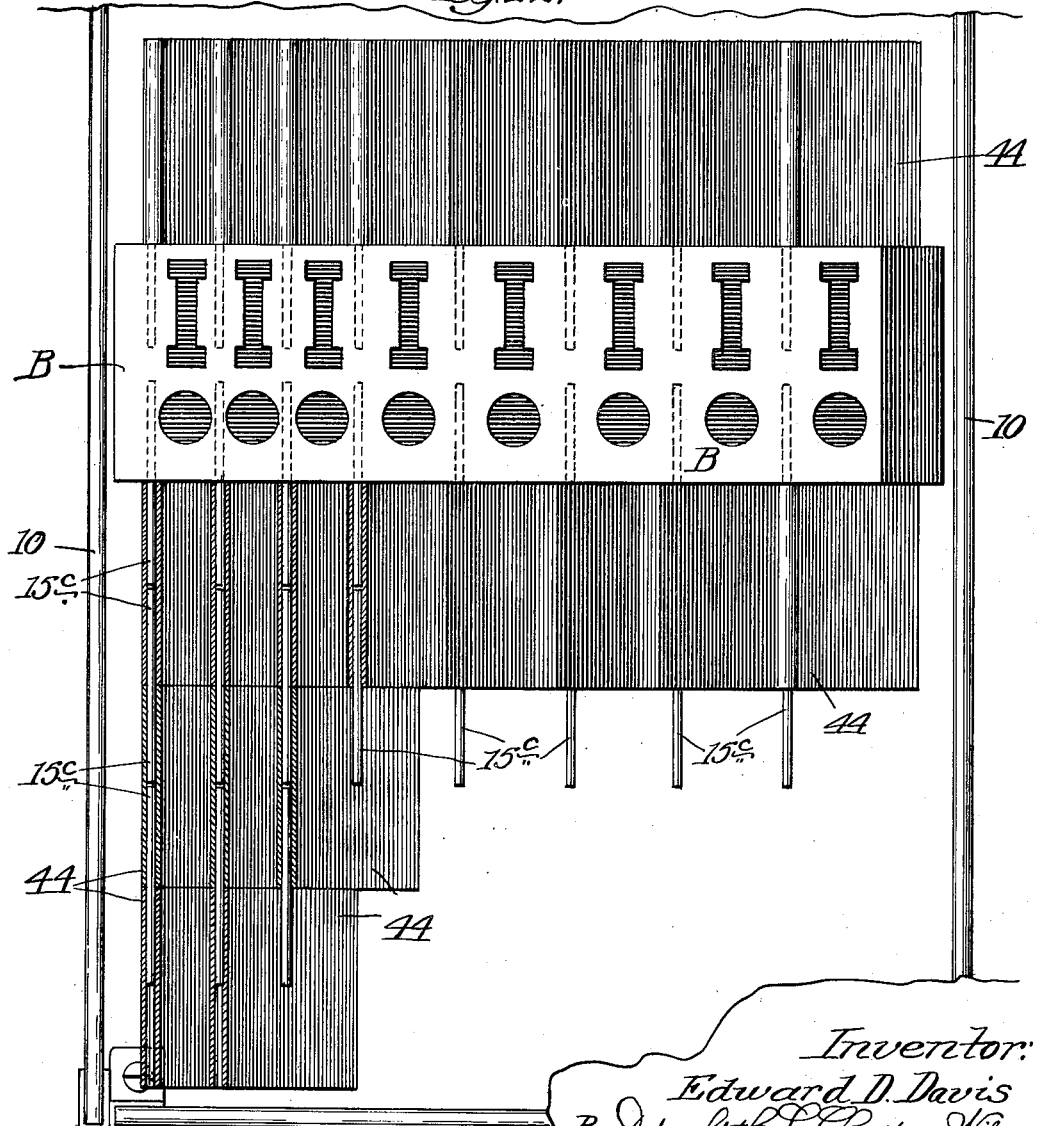

Aug. 17, 1937.  E. D. DAVIS  2,090,440
DISPLAY SUPPORT
Filed Feb. 19, 1936  6 Sheets-Sheet 6

Inventor:
Edward D. Davis,
By Dyrenforth, Lee, Chritton & Wiles,
Attys

Patented Aug. 17, 1937

2,090,440

UNITED STATES PATENT OFFICE 2,090,440

DISPLAY SUPPORT

Edward D. Davis, Chicago, Ill., assignor to The Boye Needle Company, Chicago, Ill., a corporation of Illinois Application February 19, 1936, Serial No. 64,785

24 Claims. (Cl. 40—28)

This invention relates to display supports and more particularly to supports by which articles, separate or in packages may be displayed advantageously on counters, etc., or supported on shelves, etc.

The invention is particularly useful in connection with open adjustable display cases provided with glass dividers and the like which are now in common use.

A primary object of the invention is to provide a support by which articles, packages, etc., may be carried in effective display positions by a skeleton structure which is adjustable to fit enclosures of varying sizes. Other objects and advantages will appear as the specification proceeds.

The invention is illustrated in preferred embodiments, in which—

Figure 24:
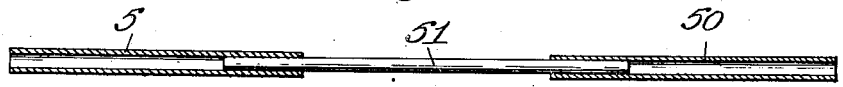
Figure 23:
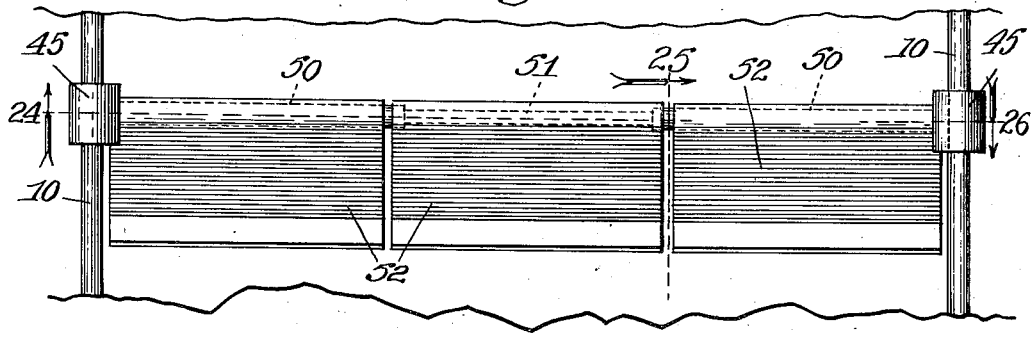
Figure 25:
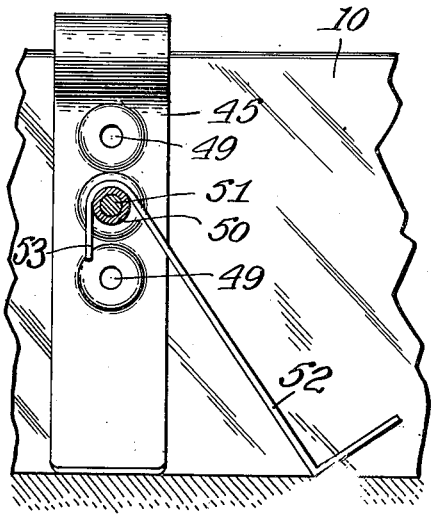
Figure 26:
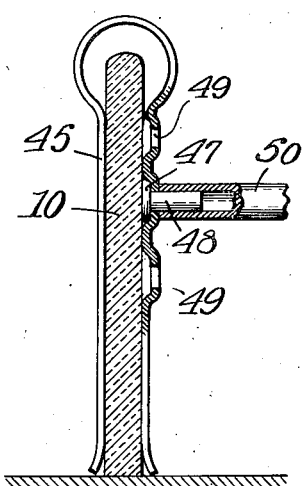
Figure 27:
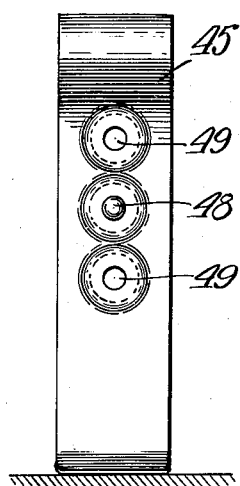

Figure 1 is a plan view of a display support employing my invention; Fig. 2, a side view taken as indicated at line 2 of Fig. 1; Fig. 3, a sectional detail view, the section being taken as indicated at line 3 of Fig. 1; Fig. 4, a plan view of a modified form of display support; Fig. 5, a side view of the same; Fig. 6, a transverse sectional view, the section being taken as indicated at line 6 of Fig. 5; Fig. 7, a broken perspective view of a portion of the movable bottom of the embodiment shown in Fig. 5; Fig. 8, a broken sectional detail view, the section being taken as indicated at line 8 of Fig. 4; Fig. 9, a broken sectional detail view, the section being taken as indicated at line 9 of Fig. 8; Fig. 10, a perspective view of a modified form of display support; Fig. 11, a transverse sectional view of the construction shown in Fig. 10, illustrating the adaptability of the device for supporting various objects; Fig. 12, a modified form of the construction shown in Fig. 10 in which partitions are disposed below the rods; Fig. 13, a plan view of a modified form of supporting device embodying my invention; Fig. 14, a broken side view of the construction shown in Fig. 13, the pins being equipped with article supports; Fig. 15, a view similar to Fig. 14 but showing a different form of package supports; Fig. 16, a broken perspective view of the type of article support or container illustrated in Fig. 15; Fig. 17, a broken transverse sectional view of a modified form of display support embodying my invention, the view being taken as indicated at line 17 of Fig. 18; Fig. 18, a broken side view in elevation of the modification shown in Fig. 17; Fig. 19, a perspective view of a support equipped with an extensible clip; Fig. 20, a perspective view of the clip extension shown in dotted lines in Fig. 19; Fig. 21, a view similar to Fig. 2 but showing a modified form of arrangement of the article supports; Fig. 22, a plan and partly sectional view of a modified form of supporting construction, the section being taken as indicated at line 22 of Fig. 21; Fig. 23, a plan view of a modified form of supporting apparatus embodying my invention; Fig. 24, a sectional view the section being taken as indicated at line 24 of Fig. 23; Fig. 25, a transverse sectional view, the section being taken as indicated at line 25 of Fig. 23; Fig. 26, a broken enlarged sectional view, the section being taken as indicated at line 26 of Fig. 23; and Fig. 27, an inside view in elevation of the clip support.

In the illustration given in Figs. 1, 2 and 3, A designates an open case formed by adjustably connected dividers and B my improved display support received within the enclosure A.

The enclosure A is of well-known construction and need not be described in detail. Walls or dividers 10, which may be formed of glass or other suitable transparent or opaque material, are frictionally gripped within sockets 11 provided by supporting elements 12. With this construction, compartments of varying size can be readily provided on the top of counters or the like and in them various types of merchandise can be displayed.

My display support B is designed to provide compartments of varying sizes which may be adjusted to fit an enclosure formed by dividers 10 of a desired size or shape. As shown more clearly in Figs. 1 and 2, the support B is provided with a central block or supporting wall 14. Through the block 14 extend a series of spaced rods 15 upon which supports sections 16 are pivotably mounted. The rods 15 may extend entirely through the block 14 or, if desired, short separate rods may be employed which extend from each side of the block and only part way through the block.

The central block or wall 14 may be employed to serve two important uses. It may be used to support an index for the articles appearing on both sides of the block as, for example, a needle list setting forth thread sizes for the needles on opposite sides thereof and interchangeable groupings of sewing machines to which the needles in the several compartments are applicable. The needle list is illustrated in a brief manner by the inscriptions indicated by the numeral 17.

Another use for the block 14 is to support the shuttle cases 18 and bobbin cases 19. As shown more clearly in Figs. 1 and 3, the block 14 is provided with circular openings 20 adapted to receive the shuttle cases 18, the top wall of the block serving to engage the flanges 18ª carried by the cases 18. Slots 21 receive the bobbin cases 19, and the cases are suspended within the slot by engagement between the flanges 19ª of the cases 19 with the top wall of block 14.

The compartment section supports 16 may be of any suitable construction. In the illustration given, the section consists of a strip of metal or other suitable material having its top portion provided with a cylindrical hinge 22 adapted to receive one of the rods 15, as shown more clearly in Fig. 2. The bottom wall 23 is turned upwardly at an angle so as to maintain the merchandise in position against the inclined central web 24 of the section. As illustrated more clearly in Fig. 2, the bottom flanges or walls may be of such a length as to contact the preceding web 24 and thus form compartments closed at their lower ends. This formation is illustrated in the lefthand side of Fig. 2 and the bottom walls are indicated by numeral 23ª. On the other hand, the bottom walls may be left out of contact with the preceding flange, if desired, as illustrated in the forward portion of the device in Fig. 2. With the particular construction shown, it will be obvious that a front wall is not necessary for the display device because the angularly disposed bottoms 23 and 23ª maintain the merchandise tilted rearwardly against flange 24 and thus prevent it from falling out of the compartment. The angle of inclination of the sections 16 can be varied by the adjustment of pin 15, as illustrated more clearly in Fig. 18.

In the operation of the construction shown in Figs. 1 to 3, inclusive, the adjustable pins or rods 15 are placed in position, as shown more clearly in Figs. 1 and 3 and the section supports are inserted on to the pins, the cylindrical hinges 22 receiving the pins. If the compartment to be filled is of the size shown in Fig. 1, the section supports on one side may be staggered, as indicated on the lefthand side of Fig. 1. The staggering of the sections 16, moreover, gives a better display of the packages or articles. If desired, wall 14 may be moved to one side of the space adjacent one of the dividers 10 and all of the sections may be placed on the pins at one side of wall 14; that is, there may be two or more sections 16 on a single rod. While in the form shown in Fig. 1, the packages, etc., may be placed in staggered relation, if desired, the packages may be placed in aligned side by side position on one side of the wall 14 because it is not necessary to place the envelopes in exact alignment with the sections 16. Portions of the envelopes may extent laterally from the sections 16.

If, instead of using a single rod 15 extending through the block 14, separate rods are employed for each side of the block 14, adjustments can also be readily made. For example, the rods on one side of the block 14 may be entirely removed so that the block may be brought adjacent one of the dividers. The sections 16 on the opposite side of the block may then be adjusted on their rods or pins 15 to fit the space provided by the glass dividers 10. Other adjustments will be obvious to those skilled in the art.

In the modification illustrated in Figs. 4 to 9, inclusive, the block 14ª is of the shape illustrated more clearly in Figs. 4 and 5. Inclined slots 25, as shown more clearly in Fig. 8 are formed at the top portion of the block and receive middle sections 26 of partitions 27. The central portions 26 of the partitions 27 are cut away, as shown more clearly in Fig. 8, so as to fit within the slots 25, the partitions 27 extending downwardly toward the bottom portion of block 14ª.

In order to give the merchandise a stepped arrangement and to seal the bottom of the compartment, I provide a pair of movable bottom walls 28, as shown more clearly in Fig. 7, the bottom wall having upwardly inclined ridges 29.

The ridges or bottom supports 29 may be of any desired size to produce the desired elevation of the merchandise within the several compartments, as shown more clearly in Fig. 5, the ridges 29 sealing the bottom of the compartments so as to form compartments closed except as to their upper ends. The bottoms 28 are laterally movable so that packages may be positioned thereon in the same staggered relation as illustrated on the lefthand side of Fig. 1. In the modification, the lateral extension of the compartment is provided merely by shifting the bottom walls 14.

In the modification shown in Fig. 10, a case 30 is employed which is provided with a top 31. If desired, the top 31 may carry an interchangeable needle list or similar index for other articles upon its top surface, as illustrated in connection with Fig. 1. Extending through the walls of case 30 are shiftable pins 32. Upon the pins 32 may be suspended articles of merchandise, or, if desired, section supports, such as illustrated in Fig. 1 etc.

In Fig. 11, the case 30 is illustrated as carrying rod 32 upon one side of which are suspended rings 33, the rings 33 being merely illustrative of articles which may be thus suspended and displayed. In this construction a supporting section, such as section 16 which was described in connection with Fig. 1, may be supported on one side of the case 30 while the rings 33 or other objects such as for example, safety pins, buttons, etc., may be suspended on the other side of the case.

In Fig. 12, the compartment 30ª is shown provided with partitions 34 which extend below the pins 32ª. The rods or pins 32ª provide rounded top surfaces for the walls 34.

In the modification shown in Fig. 13, a single wall 35 provides a support for the rods 15ª. The wall 35 may, if desired, be supported within metal bases 36. Secured to the rods 15ª may be the section supports 16ª, as shown more clearly in Fig. 14. Supports 16ª are substantially the same in construction as the members 16 shown in Figs. 1 and 2.

If desired, section supports 16ᵇ, which are of general rectangular shape and which open only at their upper ends, shown more clearly in Figs. 15 and 16, may be used.

The supporting rods may be formed of metal or other suitable material and may be of varying shapes and carried in different positions on the supporting wall or block. In Fig. 17, the rods 15ᵇ are bent to form a U-shaped slot 37, the slot being adapted to receive cards 38 upon which may be placed written matter relating to the contents of the compartments.

A central block 17ª may be formed of metal having secured to its inner sides blocks 39 of wood or other suitable material, the hollow block 17ª being open at its lower side. The sides of the member 17ª and blocks 39 are provided with aligned perforations 40 adapted to receive the supporting pins or rods. The holes or perforations 40 are spaced vertically and horizontally in sufficiently close relation to provide for lateral and vertical adjustment of the pins 15ᵇ. With this construction, the compartments can be formed close together or relatively wide apart. Also, the angle of inclination of the supporting sections can be changed. It will be observed that after the pins in Fig. 18 are dropped to the lower perforations 40, the supporting sections will be inclined more at an angle.

The perforations, shown in Figs. 17 and 18, are for the purpose of illustration and it will be understood that the location and number of such perforations will vary in accordance with the type of merchandise served. The important thing is that perforations should permit both lateral and vertical adjustment.

If it is desired to enlarge the holding capacity of the section supports 15, a clip 41, having inwardly turned lower edges 42 providing a slot 43, may be caused to engage the bottom 23 of section 15 so as to increase the width thereof, as indicated more clearly in Fig. 19. The clip is shown in detail in Fig. 20.

The display supports heretofore described may be readily adjusted to fit within the compartments formed by the glass dividers and may be so adjusted within such space to display the merchandise in its most advantageous manner. The absence of side walls enables the purchaser to see the merchandise more clearly because the transparent dividers do not interfere with the view. It will also be obvious that without some of the supports herein described the front divider forming the compartment may be omitted because the merchandise does not depend upon the front divider or wall for support. The inclined section support maintains the merchandise securely in position.

If desired, the display device may be removed from the compartment and placed upon and operated from a shelf or, it may be placed upon a counter and used without glass dividers or dividers of any type.

If, in use within compartments formed by dividers, it is found that the display support is smaller than the compartment available, the support may be increased in width, as heretofore described, to fill the entire compartment, the section supports 16 being moved laterally, as illustrated in Fig. 1, or the slidable bottom 28 being moved laterally. If desired, the section supports may be provided with stops or sides preventing cards or articles in one section from sliding into a section located in side by side relation.

As described in connection with Figs. 5, 6 and 7, the increased width thus provided enables more merchandise to be displayed and, by providing a staggered or other relation, displayed more effectively.

In the modification shown in Fig. 21, the supporting block B is placed between glass dividers 10, as in the construction shown in Fig. 1. The article supporting sections 44, however, are reversed from their positions shown in Figs. 1 and 2, the bottom walls 23ᵇ being turned downwardly toward the top wall of the counter. In this position, packages, or other merchandise, can be supported at a different angle from that provided by the construction shown in Fig. 2. The sections 44 are identical with the sections 24 of Fig. 2 and are supported in exactly the same manner, the only difference being that the sections 44 are reversed in position.

In the modification shown in Fig. 22, a plurality of supporting pins 15ᶜ are employed for supporting on one side of the block B a plurality of supporting sections 44. It will be noted that the pins 15ᶜ are received within the cylindrical hinges of the sections 44 and provide with the hinges extensions by which articles can be supported at quite some distance from the block B.

In the modification illustrated in Figs. 23 to 27, inclusive, the adjustable dividers or walls 10 which form the case compartments are provided with spring clips 45. The clips 45 are shown provided at their inner sides with indentations 46 adapted to receive the head 47 of a pin 48. The pin 48 is adapted to extend through openings 49 which are spaced apart to provide for adjustment of pin 48. The head 47 of pin 48 may be soldered in position, or may be allowed to remain freely in position. In the latter case the abutment of wall 10 against the rear face of head 47 maintains it in the position shown in Fig. 26. Engaging pins 48 on opposite sides of the case are the tubular members 50. Telescopically received within the members 50 is a supporting rod 51. An article support 52 is provided with a curved end 53 extending over the rods 50 or 51. If desired, the support 52 may be provided with a cylindrical hinge like that shown in Figs. 1 and 2, the hinge being slipped over the ends of tubular members 50 before connecting the tubes 50 with the intermediate bar 51.

With the construction shown, the pin 48 may be adjusted vertically to elevate the tubes 59 to the desired height, while longitudinal adjustment can be provided by shifting the clips 45 along walls 10. If desired, the intermediate rod 51 may be omitted, thus providing an aisle space between the tubes 50. If desired, each of the tubes may be provided with inner telescoping rods which may be drawn toward each other or to meet each other.

It will be obvious that many modifications may be made with this construction whereby article supports can be adjustably provided to meet the requirements of the adjustable compartments provided by the dividers 10.

The display sections have been found particularly useful in the display of needle packages of the transparent window-type shown in my copending application, Serial No. 58,422 for Display packages. The packages are so supported by the sections 16 as to permit light to pass through them thus revealing the needle eye and enabling a customer to see the needle without breaking the package. This transparency is made possible for each package by the staggered relation afforded by the supports.

While in the foregoing description I have set forth certain specific forms of supporting rods, blocks and sections, it will be understood that these may be changed considerably in size, shape, construction, material, etc., without departing from the spirit of my invention.

The foregoing detailed description has been given for clearness of understanding only, and no unnecessary limitations should be understood therefrom, but the appended claims should be construed as broadly as permissible, in view of the prior art.

I claim:

1. In combination with an open display case provided with at least one adjustable side wall, a removable display support adapted to be received within said case, said display support comprising a supporting wall, laterally extending members carried by said wall, and supporting members carried by said laterally extending members and being shiftable laterally to increase the capacity of said display support.

2. In combination with an open display case provided with at least one adustable side wall, a removable display support adapted to be received within said case and to be laterally adjustable to fill the space provided by the adjustment of said adjustable wall, said display support comprising a supporting wall, laterally extending members carried by said wall, and support members carried by said laterally extending members for providing article supports, said support members being laterally movable.

3. A display support for articles, etc., comprising: a supporting wall, laterally extending members supported by said wall, and laterally shiftable members cooperating with said laterally extending members for providing article supports.

4. A display support, comprising: a central wall, laterally extending partition walls carried by said first mentioned wall, and means providing angularly disposed bottoms for said partition walls adapted to cause articles carried thereby to rest against said partition walls.

5. A display support, comprising: a supporting wall and laterally extending partition walls carried by said supporting wall, and means providing angularly related bottoms for said partition walls, said angular bottoms causing the merchandise carried thereby to tilt rearwardly against the partition walls.

6. A structure as set forth in claim 5 in which the bottom walls are of varying heights.

7. In combination with an open display case provided with adjustable walls, a supporting wall, and a series of laterally extending rods carried by said wall and adjustably mounted thereon.

8. In combination with an open display case provided with adjustable walls, a supporting block adapted to be received within said case, and a series of rods carried by said block and laterally adjustable thereon.

9. In combination with an open display case having adjustable walls, a removable supporting wall within said case, a series of laterally extending supports carried by said wall, and section supports adjustably mounted on said first-mentioned supports and providing at least a rear wall and an angularly disposed bottom wall.

10. In combination with an open display case provided with adjustable transparent side walls, a removable display support adapted to be received within said case and to be adjusted laterally to fill said case, said display support having a supporting wall and laterally adjustable article supports.

11. In combination with an open display case provided with adjustable transparent side walls, a removable display support adapted to be received within said case and to be adjusted laterally to fill said case, said display support having a supporting wall and laterally adjustable article supports, said article supports being without side walls.

12. A display support, comprising: a supporting wall and laterally adjustable supports carried by said wall.

13. A display support, comprising: a supporting wall and laterally adjustable supports carried by said wall, said article supports having no side walls.

14. A display support, comprising: a central wall, a rod extending laterally from said wall, and an article support carried by said rod, said article support comprising at least a rear wall and a bottom wall extending forwardly and upwardly, said article support being laterally adjustable on said rod.

15. A display support, comprising: a central wall, laterally extending partition walls, and a bottom wall below said partition walls and laterally removable with respect thereto.

16. A display support, comprising: a central wall, laterally extending partition walls, and a bottom wall below said partition walls and laterally removable with respect thereto, said bottom wall having ridge formations thereon providing individual angularly disposed bottom walls for said partition walls.

17. A display support, comprising: a central wall, laterally extending partition walls, and a bottom wall below said partition walls and laterally removable with respect thereto, said bottom wall being provided with ridges of varying heights providing individual bottom walls for said partition walls.

18. In combination with an open countercase provided with adjustable walls, oppositely disposed clips engaging said walls, and supporting members extending across said case and secured by said oppositely disposed clips.

19. In combination with an open countercase having adjustable walls, clips engaging oppositely disposed walls, and an adjustable supporting member having its ends supported by said clips on said opposite walls.

20. In combination with an open countercase provided with adjustable walls, clips engaging said walls and being adjustable thereon, and supporting members carried by said clips and extending into said case.

21. The structure of claim 20 in which said supports carried by clips on opposite sides of the case are provided with connecting members.

22. The structure of claim 20 in which said supporting members are vertically adjustable upon said clips.

23. In combination with an open countercase having adjustable walls whereby compartments of varying sizes may be formed, article supports, and means adjustable to fit said compartments for supporting said article supports within said compartments.

24. In combination with an open countercase having adjustable walls, an inner case providing article supports, said inner case being adjustable to fit varying-sized compartments formed by the outer case.

EDWARD D. DAVIS.